July 22, 1947.    M. HALLEAD    2,424,456
PROPELLER MOUNTING
Filed Nov. 27, 1944
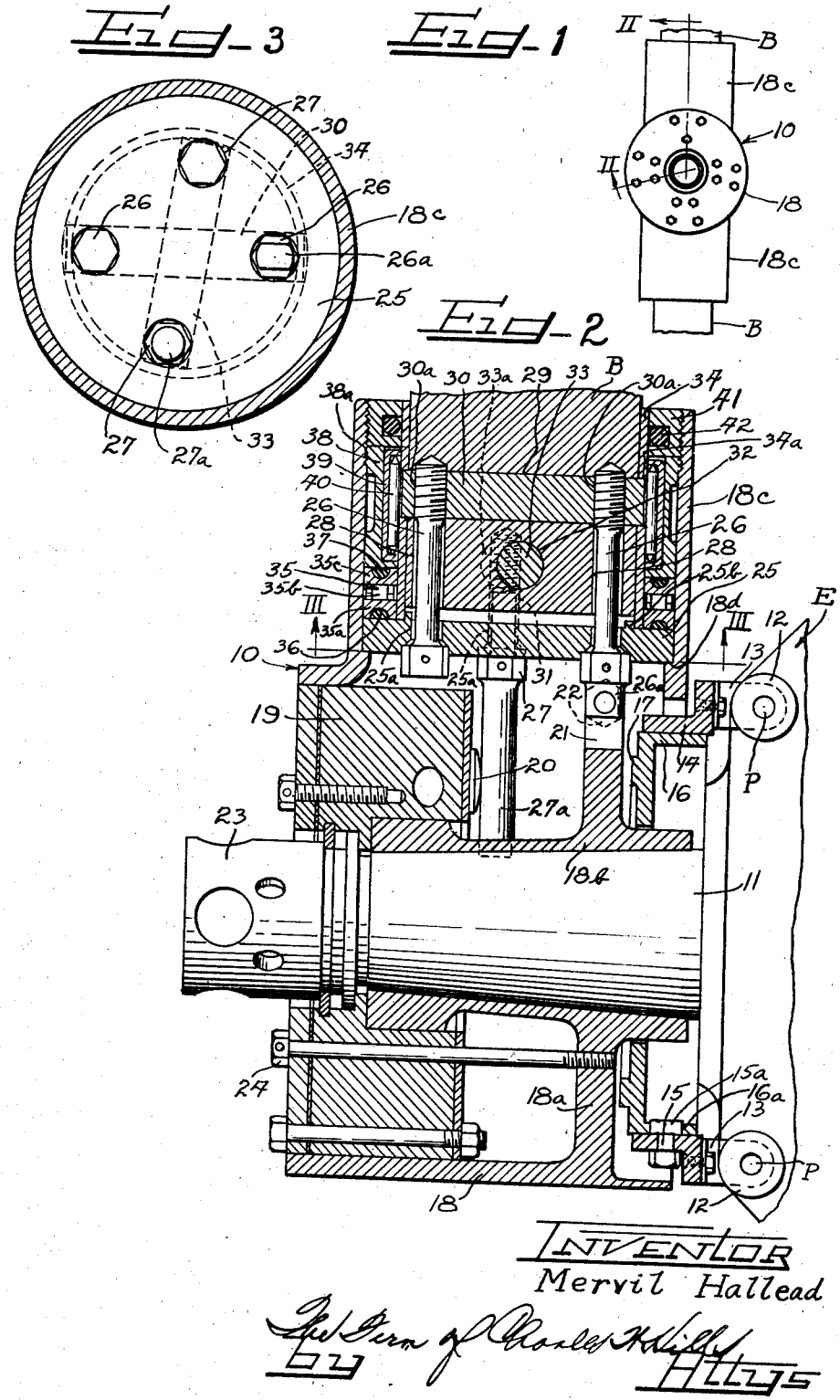
INVENTOR
Mervil Hallead

Patented July 22, 1947

2,424,456

UNITED STATES PATENT OFFICE 2,424,456

PROPELLER MOUNTING

Mervil Hallead, Detroit, Mich., assignor to Thompson Products, Inc., Cleveland, Ohio, a corporation of Ohio Application November 27, 1944, Serial No. 565,337

1 Claim. (Cl. 170—173)

This invention relates to mountings for anchoring blades in sockets or the like.

Specifically, the invention relates to propeller mountings for rotatably carrying propeller blades in a propeller hub.

According to this invention a hub member having a plurality of radially extending tubular sockets rotatably supports in the sockets thereof the inner ends of blade elements. These blade elements have end plates anchored thereon by bolts which extend through holes formed in the blades. The bolts are threaded into locking bars seated in holes formed in the blades transversely of the bolt-receiving holes. The plates project radially from the blades and form seats for thrust bearings. The inner ends of the blades are preferably surrounded by metal sleeves and cages of needle bearings surround the sleeves. The needles provide radial bearings for rotatably mounting the blades in the sockets. Nuts threaded in the sockets thrust against the thrust bearings. The blades are thus mounted for free rotation in the sockets but cannot fly out of the socket even though they are subjected to tremendous centrifugal forces.

The blade-mounting devices of this invention are especially useful with propeller pitch-changing devices since the blades are readily rotated about their own axes and yet are safely connected to the propeller hub.

A feature of the invention deals with the provision of separate thrust and radial bearings in propeller mountings.

Another feature of the invention resides in the anchoring of a thrust plate on a propeller blade without threading anchoring screws into the blade.

An object of the invention is to provide a safe and efficient rotary mounting for a propeller blade.

Another object of the invention is to provide an assembly of parts for locking a propeller blade for rotatable movement in a propeller hub.

A still further object of the invention is to provide a blade mounting wherein studs are anchored in cross bars extending through the blade.

A specific object of the invention is to provide a blade mounting wherein a thrust plate is anchored to the blade by means of studs and wherein the studs are threaded into cross bars seated in apertures formed in the blade.

Another object of the invention is to provide a rotatable blade mounting wherein thrust loads are carried by one set of bearings, and radial loads are carried by another set of bearings.

Other and further objects of the invention will be apparent to those skilled in the art from the following detailed description of the annexed sheet of drawings which, by way of preferred example, illustrates one embodiment of the invention.

On the drawings:

Figure 1 is a front elevational view of a propeller hub containing propeller blade mountings in accordance with this invention.

Figure 2 is a cross-sectional view, with parts in elevation, taken along the line II—II of Figure 1 and illustrating the parts on a larger scale.

Figure 3 is a transverse cross-sectional view, with parts in elevation, taken along the line III—III of Figure 2.

As shown on the drawings:

In Figures 1 and 2 the reference numeral 10 designates generally a propeller mounting or hub for two propeller blades B.

The hub 10 is mounted on the front of an engine E which, as shown in Figure 2, has a drive shaft or propeller shaft 11 projecting therefrom. Lugs 12 are formed on the engine E and brackets 13 are carried by these lugs on pins P passed through the lugs. The brackets 13 carry a collar 14. A control member 16 is slidably mounted in the collar. Bolts such as 15 have heads such as 15a seated in diagonal grooves or slots 16a of the control member 16 and have shanks projected through the collar 14 and held therein by nuts. Means such as a Bowden wire (not shown) are provided for rotating the control member from the cockpit of the plane. Rotation of the control member will cause it to slide in the collar 14 since the bolt heads 15a act on the diagonal slots 16a to translate some of the rotary movement into axial movement.

The control member 16 has a cam track 17 on the front face thereof for acting on a pump member (not shown) which pumps hydraulic fluid to effect change in pitch of the blades B.

The propeller hub or mounting 10 includes a generally cylindrical casing 18 with a back wall 18a and a central hub portion 18b seated on the propeller shaft 11. Cylindrical collar portions 18c extend from diametrically opposite sides of the casing 18 and form housings for the blade mountings of this invention.

A block member 19 is seated in the casing 18 around the front end of the hub 18b thereof. This block member contains hydraulically operated mechanism including plungers such as 20 for acting on the blades B to change the pitch of these blades. The back wall 18a of the casing has recesses such as 21 therein to receive the adjustable stop means such as 22 for limiting the amount of pitch change.

The block member 19 is secured on the hub 18b by means of a nut 23 threaded on the propeller shaft and bottomed on the block member 19. Bolts such as 24 are passed through the block member 19 and threaded into the wall 18a of the casing 18 to hold the block member in the casing.

The propeller blade mountings of this invention each include a thrust plate 25 secured on the end of the propeller blade B by means of two pairs of studs 26 and 27 respectively disposed in substantially right angular relationship. The stud 26 fits freely through apertures 25a in the thrust plate 25 into longitudinally extending holes 28 in the propeller blade B. These holes 28 extend inwardly from the inner end face of the blade to a transverse bore 29 formed through the blade in spaced relation from the inner end thereof. This bore 29 receives a metal rod or bar 30 in snug fitting relation therein. The rod 30 has threaded holes 30a therethrough positioned to be aligned with the holes 28 for receiving, in threaded relation therein, the threaded ends of the studs 26.

The studs 27 pass through apertures 25a in the plate 25 and through holes such as 31 in the propeller blade B. The holes 31 are not as deep as the holes 28, but are arranged substantially 90° from the holes 28. A transverse bore 32 is formed through the blade B to snugly receive a metal rod or bar 33 which has threaded holes 33a therethrough to receive the threaded ends of the studs 27.

The arrangement is such that the rods 30 and 33 carry the entire load for anchoring the thrust plate 25 to the blade B. The rods can be disposed in full right angular relationship if desired. They have been shown in less than right angular relationship so that a lug 26a on one of the studs 26 will extend into the recess 21, while a longer lug 27a of one of the studs 27 will extend in front of the plunger 20 as shown in Figure 2 when the blade with the plate 25 thereon is inserted in the collar 18c of the hub casing 18.

As shown in Figure 2, the thrust plate 25 is bottomed on a shoulder 18d of the collar portion 18c while lugs 26a and 27a extend into the casing 18 for engagement with the propeller pitch changing mechanisms to rotate the blade B in the collar 18c.

The thrust plate 25 extends radially beyond the propeller blade B and has an upstanding rim 25b thereon receiving a sleeve 34 therearound. This sleeve 34 is disposed around the blade B and has apertures such as 34a therethrough so that the locking rods 30 and 33 can be inserted into the blade. The end portions of the rods preferably extend into the apertures 34a to have a snug fit with the sleeve thereby holding the sleeve against movement on the blade and causing the sleeve to be compressively loaded when the studs are tightened to seat the plate 25 on the sleeve. As shown, the plate 25 is spaced from the end of the blade but bottomed on the projecting end of the sleeve.

A thrust bearing 35 is disposed around the sleeve 34 and has one race ring 35a thereof bottomed on the thrust plate 25. This race ring receives a packing strip 36 therein. A ring of roller bearings 35b are disposed between the race ring 35a and the second race ring 35c. This second race ring is also disposed around the sleeve 34 and has a recess receiving a packing strip 37.

A sleeve nut 38 is bottomed on the race ring 35c of the thrust bearing 35 and is threaded into the collar 18c as at 38a. This nut 38 receives a cage 39 of needle bearings 40 in an inner recess provided therein. The needle bearings 40 engage the sleeve 34 which becomes an inner race of a radial bearing, the outer race of which is provided by the cage 39.

A jam nut 41 is threaded into the collar 18c against the sleeve nut 38. This jam nut has a recess therein receiving a sealing ring 42 which sealingly engages the sleeve 34.

The bearing 35, being bottomed on the thrust plate 25 and held in the collar 18c by the nuts 38 and 41 carries axial or thrust loads of the blade B while the needle bearings 40 mount the blade for rotation in the collar 18c. Rotation of the blade is not impeded by the thrust bearing 35, since the rollers of this bearing will readily permit relative rotation between the stationary race ring 35a and the rotating race ring 35c.

From the above descriptions it should be understood that this invention provides a device for anchoring members such as blades to mountings through the use of studs which are anchored in the members on cross bars or the like seated in the members. This construction prevents the heretofore encountered stripping of screws from the members especially when the members are wooden propeller blades. The arrangement of thrust bearing and radial bearings provided by the mountings of this invention makes for easy rotation of a blade even when the same is heavily loaded as in operation. The blade pitch changing device described herein can be replaced with any suitable blade actuator, since the mountings of this invention are useful with any type of propeller pitch changing apparatus.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A blade mounting for a variable pitch propeller blade which comprises a cylindrical hub member having an internal shoulder and an internally threaded end portion, a thrust plate bottomed on said shoulder, anti-friction thrust bearings bottomed on said plate, a sleeve nut bottomed on said thrust bearings and having an internal recess open at the end remote from said thrust bearing, a cage of needle bearings seated in said recess, said sleeve nut having threaded engagement with the internally threaded end portion of said hub, a jam nut threaded in said internally threaded portion of the hub in jammed relation to the sleeve nut, a propeller blade having a pair of transverse bores therethrough in angular relationship and spaced at separate levels inwardly from the inner end thereof, metal rods seated in said bores each having a pair of transverse threaded holes therethrough, a sleeve surrounding said blade in bearing engagement with the needle bearings and having apertures receiving the ends of said rods whereby the sleeve is held against longitudinal movement on the blade, said blade having longitudinally extending holes aligned with the threaded holes of said rods, and studs having head portions bottomed on the thrust plate together with shank portions extending through said longitudinally extending holes and threaded into the threaded holes of the rods whereby the thrust plate is anchored to the blade.

MERVIL HALLEAD.

REFERENCES CITED

The following references are of record in the file of this patent:

UNITED STATES PATENTS

| Number | Name | Date |
|---|---|---|
| 1,337,133 | Howard | Apr. 13, 1920 |
| 1,779,050 | Schroder | Oct. 21, 1930 |
| 1,407,271 | Harkins | Feb. 21, 1922 |
| 1,661,631 | Nixon | Mar. 6, 1928 |

FOREIGN PATENTS

| Number | Country | Date |
|---|---|---|
| 443,750 | Great Britain | Mar. 5, 1936 |
| 572,360 | France | June 4, 1924 |
| 451,648 | Great Britain | Aug. 10, 1936 |